(12) United States Patent
Guillemette et al.

(10) Patent No.: US 6,890,169 B2
(45) Date of Patent: *May 10, 2005

(54) UNIVERSALLY MOUNTED ADJUSTABLE DIE

(75) Inventors: Glen Albert Guillemette, West Warwick, RI (US); James Prue, Griswold, CT (US)

(73) Assignee: Guill Tool & Engineering Co., Inc., West Warwick, RI (US)

(*) Notice: Subject to any disclaimer, the term of this patent is extended or adjusted under 35 U.S.C. 154(b) by 326 days.

This patent is subject to a terminal disclaimer.

(21) Appl. No.: 10/087,272

(22) Filed: Mar. 1, 2002

(65) Prior Publication Data

US 2002/0136792 A1 Sep. 26, 2002

Related U.S. Application Data

(63) Continuation-in-part of application No. 09/189,286, filed on Nov. 10, 1998, now Pat. No. 6,382,944.

(51) Int. Cl.$^7$ .............................................. B29C 47/22
(52) U.S. Cl. ........................ 425/113; 425/381; 425/466
(58) Field of Search ................................ 425/113, 381, 425/466, 190, 192 R

(56) References Cited

U.S. PATENT DOCUMENTS 6,382,944 B1 * 5/2002 Guillemette ................ 425/113

* cited by examiner

Primary Examiner—Joseph S. Del Sole
(74) Attorney, Agent, or Firm—Perman & Green, LLP

(57) ABSTRACT

A die is mounted within an extrusion die assembly to pivot with respect to the die body and thereby adjust the concentric position of the die with respect to the tip and the product to be coated. Spherical surfaces are formed in an intermediate support module to engage mating surfaces formed on the die holder. The spherical surface surround the die holder and are clamped together by screws which are limited in tightening, to avoid binding the pivotal movement between the spherical surfaces and the die holder.

7 Claims, 4 Drawing Sheets

100% # UNIVERSALLY MOUNTED ADJUSTABLE DIE

RELATED APPLICATION

This application is a continuation in part application of pending application Ser. No. 09/189,286, filed Nov. 10, 1998 and now U.S. Pat. No. 6,382,944 B1.

BACKGROUND OF THE INVENTION

Extrusion dies are frequently used to provide a tubular coating to a wire or other product which provides a generally cylindrical substrate. A typical die assembly 101 for performing this function is shown in FIG. 1. The basic assembly 101 consists of a die body 102, a tip 103, a die holder 104, and a die 105 held in place by end caps 106 and 114. The tip 103 is mounted within an axial bore of the die body 101 and is itself constructed with an axial bore 107 having a downstream exit portion 108. In operation, a wire or other tubular product 116 is fed through bores 107 and 108 to exit axially at 115. An annular extrusion passage 109, surrounds exit 115, and is positioned to receive flowing plastic and apply it, in a tubular layer, to the product 116 at exit 115.

The die assembly 101 is an assembly of machined parts, each having its own manufacturing tolerance. These tolerances tend to multiply with the assembly of the components. It is therefore a difficult task to maintain the desired coaxial relationship between the product and the extruded layer. An adjustment mechanism is generally needed to insure concentricity of the die and pin so as to provide an even thickness of the applied layer. This is generally accomplished simply by mounting the die holder 104 for adjustment, along x and y coordinates. The adjustment may be actuated through adjusting screws 112. As shown in FIG. 1, the adjustment motion of the prior art is radially towards and away from the axis 117, of the assembly 101 as a torque is applied to an adjustment screw 112. This may require a significant adjustment torque because of the high thrust loads on the die holder during operation.

It is a purpose of this invention to provide a simple mechanism for adjusting the relative position of the die with respect to the pin to apply a consistently concentric layer of plastic about the circumference of the product, while reducing the torque required to adjust the position.

SUMMARY OF THE INVENTION

The die assembly of this invention may be generally described as a cross head die in that it receives molten plastic from an extruder which enters the die passages in a direction that is transverse to the longitudinal axis of the assembly. The plastic must then be turned to flow downstream axially towards an annular tapered extrusion channel. The extrusion channel surrounds an axially extending passage through which a wire or tubular product may be directed to receive a cylindrical layer from the extrusion passage. In order to apply a cylindrical layer of constant radial depth, the position of the die relative to the tip must be precise. Since the degree of positioning accuracy cannot be maintained during assembly of the components, an adjustment mechanism is provided which allows the relative position of die and tip to be adjusted after assembly.

The die body of this invention is constructed with a recess at its downstream end to receive the die holder which supports the die in a fixed relation. The die holder and die body recess engage to allow a pivot motion between the two components. To accomplish the pivot motion, the recess is constructed with a spherical internal surface which mates with a spherical external surface constructed on the die holder. These surfaces engage and operationally cooperate to allow the die holder to pivot in a substantially universal motion. To actuate the adjustment, adjusting screws are provided in the die body which engage the die holder at a position axially displaced from the spherically engaged surfaces of the die body and die holder. This provides a mechanical advantage proportional to the distance that the adjustment screws are displaced from the fulcrum formed by the spherical surfaces and results in a reduction of the torque which must be exerted on the adjustment screws to correct the relative position of the die and tip. In this manner the die and tip may be accurately maintained in a concentric relation.

In an alternate embodiment of this invention, the spherical surfaces of the die holder seat are constructed on an intermediate support module. The intermediate support modules comprises a pair of seat elements each having spherical surface portions to receive the spherical surfaces constructed on the die holder. The seat elements are assembled around the die holder and secured together by screws. By operation of the screws is designed to limit their tightening to provide a clearance. The assembled intermediate support module is positioned within a recess in the die body and secured by an end cap. This prevents the end cap from being overtightened and causing binding of the adjustment mechanism.

DESCRIPTION OF THE DRAWING

The invention of this application is described in more detail below with reference to the Drawing in which.

DESCRIPTION OF THE PREFERRED EMBODIMENT

Figure 1:
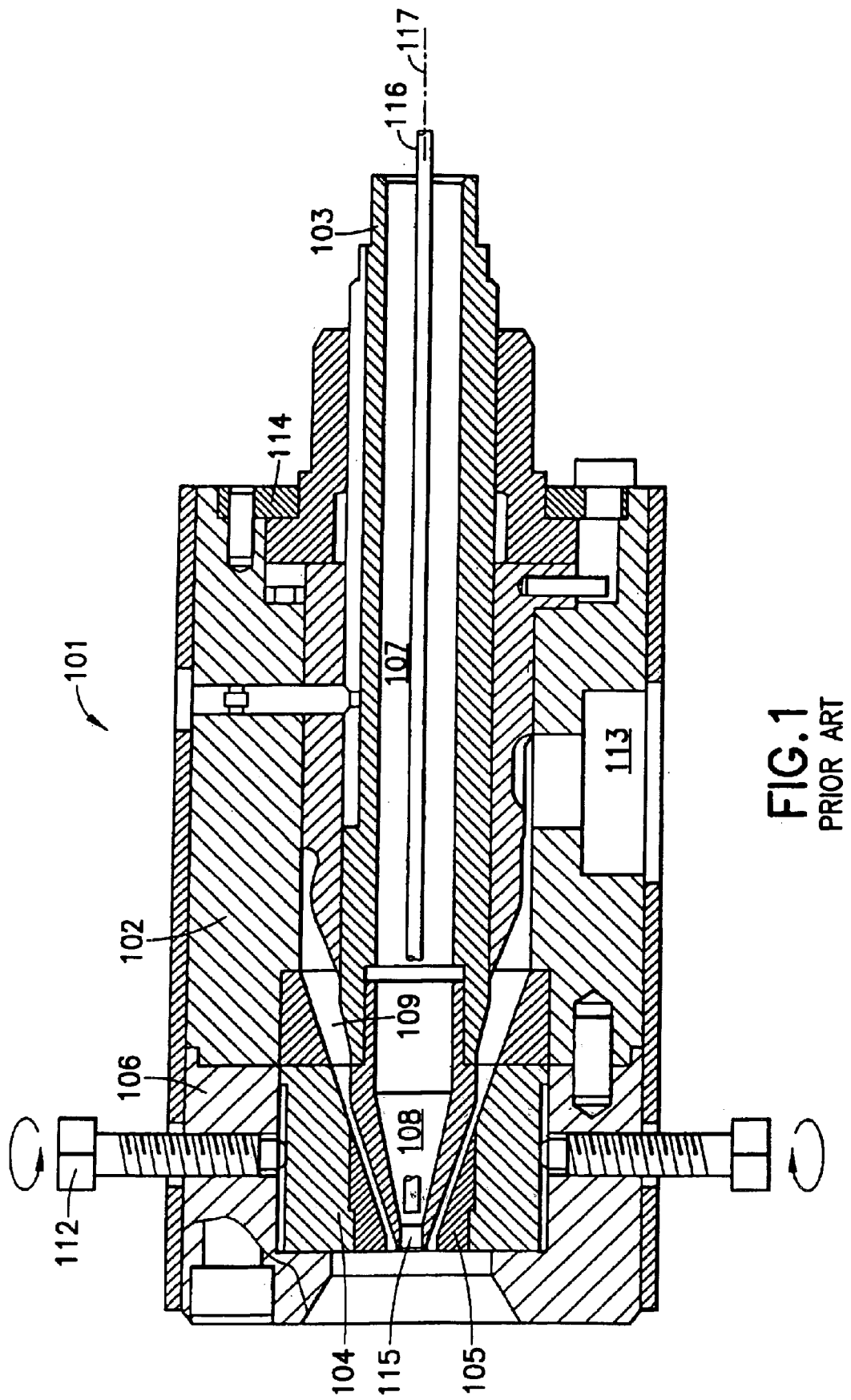
FIG. 1 is a sectional view of an extrusion die assembly showing the adjustment mechanism of prior art.
Figure 2:
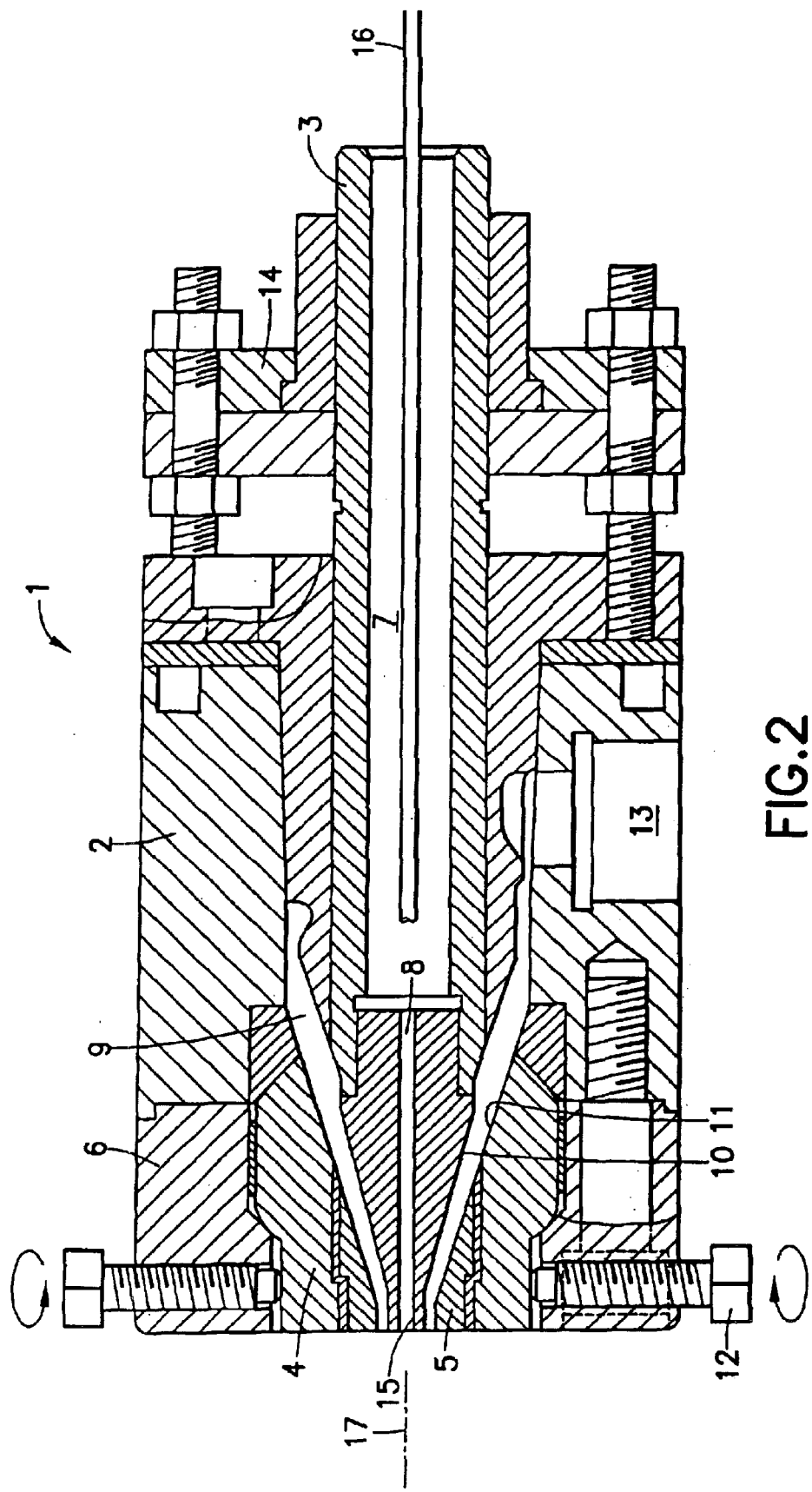
FIG. 2 is a sectional view of an extrusion die assembly showing the adjustment mechanism of this invention.

An extrusion die assembly 1, constructed in accordance with the subject invention, is shown in FIG. 2. The assembly 1 receives plastic from an extruder (not shown) and supplies it to a tapered annular extrusion channel 9 where it is extruded and applied to a wire 16. The general function of the die head 1 is to receive plastic at upstream inlet 13 and distribute it to downstream outlet 15 in a flow pattern that is evenly dispersed about the extrusion channel 9.

Figure 3:
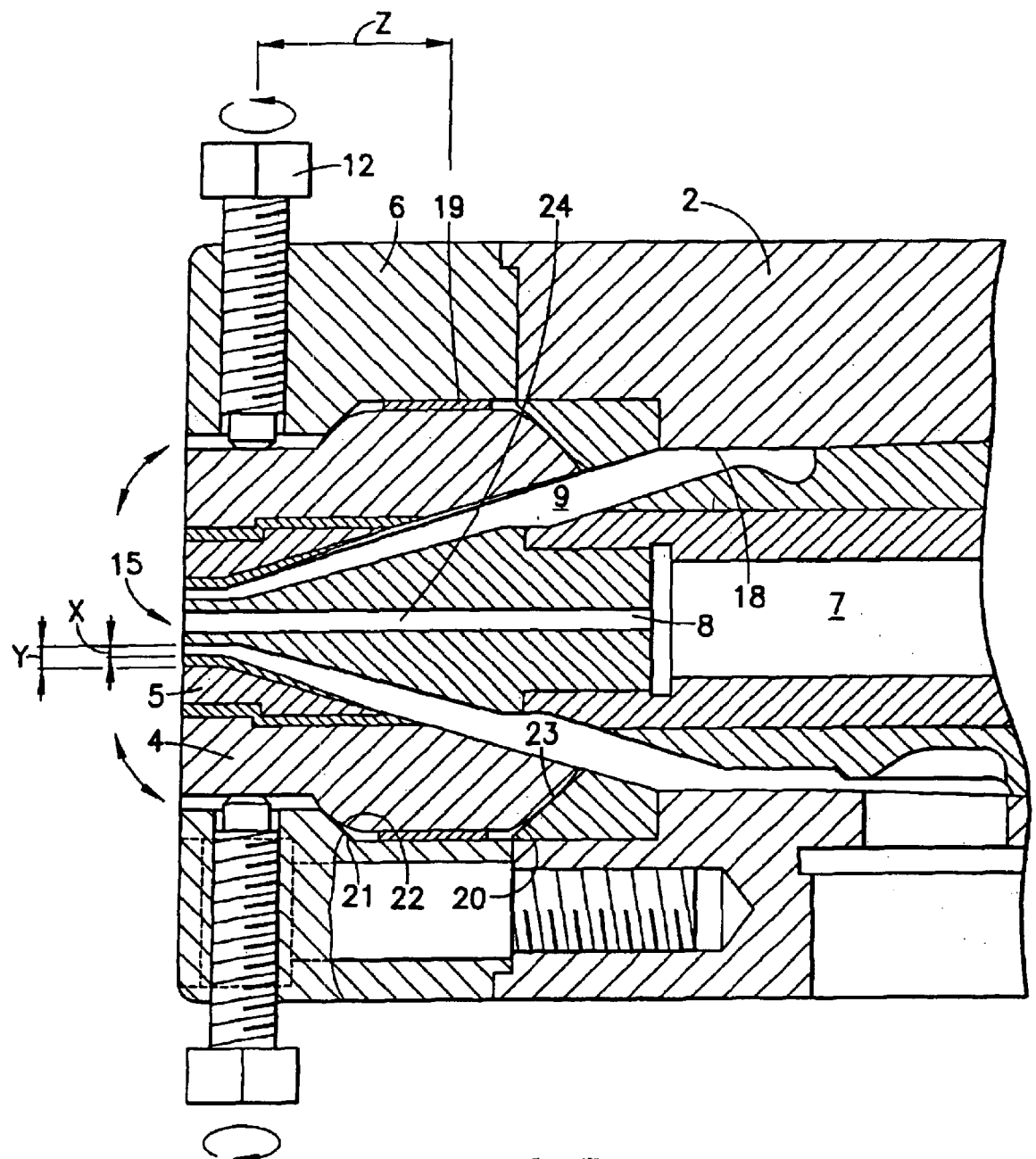
FIG. 3 is an enlarged sectional view of the adjustment mechanism of this invention.

Extrusion die assembly 1 consists of components which are assembled in alignment with the axis 17 and cooperate to form an extrusion passage 9. Die body 2 is a generally cylindrical element having an internal axial bore 18 having openings at its upstream and downstream ends. A tip 3 is assembled within the bore 18 and extends to the outlet 15 at the downstream end of the die body 2. Bore 18 is constructed with a recess 19 concentric with the bore 18. Die holder 4 is assembled within recess 19 and is constructed with a surface 11, which is tapered inward to form the exit 15 of the extrusion channel 9. A similarly shaped surface 10 is constructed on the downstream end of the tip 3 in a manner which provides a clearance with the surface 11 to form an annular tapered channel 9 in the assembled position. A die 5 may be removably fixed within the die holder 4 to complete the extrusion channel 9. As best shown in FIG. 3, the exit 15 of the extrusion passage is formed by the cooperation of the die 5 and the tip 3. The dimensions and configuration of the exit 15 is dependent on the relative position of these members. Tip 3 is constructed with an axial bore 7 having a downstream end 8 to provide a passage through which a tubular product, such as a wire 16 may be passed to receive a layer of plastic issuing from extrusion passage 9. In order to deposit a cylindrical layer of plastic on an elongated product in a uniform thickness, the die 5 and tip 3 must be positioned concentrically. The components of the die assembly may be secured in the assembled position by caps 6 and 14. The caps are attached to the die body 2 means of threads or by bolts.

Because of the accumulated tolerance errors within the assembly 1, it is necessary to provide a means by which the concentric position of the die 5 may be adjusted with respect to the pin 3. The overall motion required for adjustment is small, i.e., the difference between dimensions x and y as shown in FIG. 3. To provide this motion, the inner surface of the recess 19 is provided with a spherical seat and the outer surface of the die holder 4 is constructed with a mating spherical contour. More specifically a spherical surface 20 is machined into the recess 19 at its upstream side while a similar surface 21 is machined in the downstream side of the recess 19. Mating surfaces 22 and 23 are machined on the die holder 4 to engage the surfaces 20 and 21 respectively.

Although a full spherical engagement could be constructed, it has been found that, by employing a suitable clearance, sufficient motion can be allowed with the partial spherical engagement shown. This reduces the machining required and simplifies the manufacture of the adjustment means of this invention.

The spherical relationship between the engaging surfaces of the die holder 4 within the recess 19 allows the die to be pivoted within the extrusion passage 9, thereby adjusting the dimensions and configuration of the exit 15. To accomplish the adjustment, adjusting screws 12 are provided in the cap 6 at a distance z downstream of the center 24 of the spherical surfaces 20 through 23. The distance z provides a mechanical advantage through the leverage of the force exerted by the adjustment screws 12 on the die holder 4. The lever arm 2 also provides an adjustment movement which is maximized at the downstream end of the die holder 4 with a relatively small movement occurring at the upstream end of the element 4. In this manner an accurate and sensitive adjustment can be made, even under the loads placed on the components during operation of the extrusion die 1.

Alternate Embodiment

In the embodiment shown in FIGS. 2 and 3, the die holder 4 is supported between die body 2 and cap 6. Cap 6 is secured to die body 2 by means of multiple screws, one of which is shown as screw 35 in FIG. 4. The operative cooperation between cap 6 and die body 2 clamps the die holder 4 in place. Care must be taken to avoid binding the adjustment movement of die holder 4 within its spherical seat. A bound condition may result by the over tightening the clamping force exerted on die holder 4.

Figure 4:
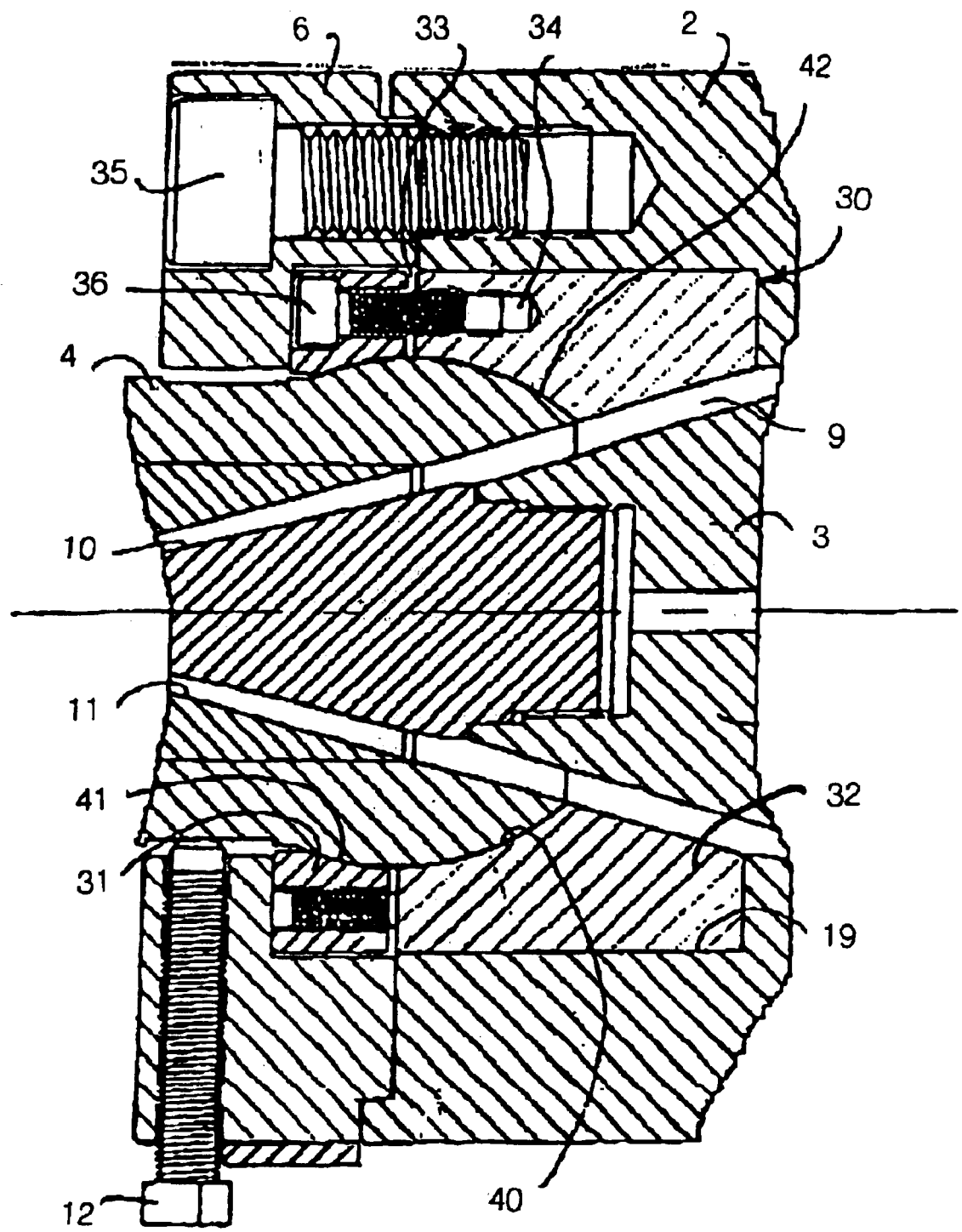
FIG. 4 is an enlarged sectional view of an alternate embodiment of the adjustment mechanism of this invention.

In some applications, therefore, it may be advantageous to employ an intermediate support module 30, as shown in FIG. 4. The purpose of the module 30 is to provide a replaceable mounting arrangement which can be manufactured independently to construct the mating spherical surfaces in a simpler and more accurate method. In addition the module 30 is constructed with means to limit the clamping forces on the die holder 4.

Intermediate support module 30 is constructed having an upstream seat element 32 and a downstream seat element 31. The inner surface 40 of seat element 32 is spherically shaped to form a partial spherical seat. Similarly seat element 31 has an inner surface 41 which is also spherically shaped to form an second portion of the spherical seat. Partial spherical surfaces 40 and 41 cooperate to form a spherical mating surface for engaging the spherical surface 42 constructed on die holder 4. Support module 30 is assembled by sequentially arranging the die holder 4 into engagement with seat surface 40 of seat element 32. The assembly is completed by engaging the seat surface 41 of seat element 31 over the exposed spherical surface 42 of die holder 4. The module 30 is held in the assembled conditions by multiple screws 36. Screws 36, as shown in FIG. 4, fit through a countersunk bore 37 of seat element 41 to engage an aligned threaded bore 34. The screws 36 are tightened to secure the assembly. A clearance 33 is maintained by the action of screws 36. This is accomplished by designing the bore 34 to limit the tightening, so as to maintain a predetermined clearance 33. The assembled module 30 may be secured by positioning within the recess 19 of die body 2 and tightening the cap 6 into engagement. In this instance it can be observed that the action of screws 36 will prevent the over tightening of bolts 35. This will effectively avoid binding the movement of die holder 4.

We claim:

1. An extrusion die assembly constructed to process a stream of flowing plastic from an upstream inlet to a downstream outlet, said inlet and outlet being displaced longitudinally along an axis of said assembly, said extrusion die assembly comprising:

a die body having a first bore extending longitudinally from the upstream to the downstream end of the assembly and an inlet constructed in the die body for receiving flowing plastic, said first bore also being constructed having a recess at the downstream end;

a tip element positioned within and coextensive with the first bore in alignment with the axis of the assembly, said tip element being constructed having a second bore extending longitudinally from the upstream end to the downstream end of said tip element to provide a passage for the processing of an elongated product;

a die assembled within the recess of the first bore, said die operatively associated with the tip to form the downstream outlet;

a passage, formed by the cooperation of the die body, tip, and die, for distributing the flow of plastic from said inlet to said outlet;

an adjustment mechanism constructed in the assembly to provide relative motion between the die body and the die, said mechanism allowing the adjustment of the outlet to compensate for inaccuracies in the relative positioning of the die with respect to the tip and thereby enabling the deposition of a uniform layer on the product; said mechanism comprising:

an upstream seat element positioned in the recess of the die body, said upstream seat element constructed with a first surface having at least a partially spherical shape, said spherical shape having a radius of curvature with a center;

a downstream seat element constructed for assembly with said upstream seat element, said downstream seat element constructed with a second surface having at least a partially spherical shape, said spherical shape having a radius of curvature with a center, wherein, when assembled said second surface forms at least a partial continuation of said first surface to form a seat surface;

a third surface constructed on said die, said third surface having at least a partially spherical shape, said spherical shape having a radius of curvature with a center, said seat surface and said third surface being concentrically engaged at a mutual spherical interface positioned upstream and downstream of said center, said surfaces operatively cooperating to allow the die to pivot relative to the die body about said center of said radius of curvature;

an attachment mechanism constructed to secure said first and second seat elements in the assembled position surrounding said third surface, said mechanism further constructed to limit the movement of said first and second seat elements towards said third surface in order to prevent binding of said seat surface and said third surface in the assembled position; and an actuator constructed in the extrusion die assembly to exert a force on the die at a position downstream from the center of said radius of curvature of said first and second surfaces to cause movement between said surfaces and pivot the die to adjust the relative position of the die with respect to the tip.

2. An extrusion die assembly constructed to process a stream of flowing plastic from an upstream inlet to a downstream outlet, said inlet and outlet being displaced longitudinally along an axis of said assembly, said extrusion die assembly, as described in claim 1, wherein said attachment mechanism comprises at least one screw in threaded engagement between said first and second seat elements, said threaded engagement being restricted to limit movement of said seat elements into engagement.

3. An extrusion die assembly constructed to process a stream of flowing plastic from an upstream inlet to a downstream outlet, said inlet and outlet being displaced longitudinally along an axis of said assembly, said extrusion die assembly, as described in claim 1, wherein said attachment mechanism provides a predetermined clearance between said seat elements.

4. Apparatus for adjusting the relative position of a die in an extrusion die assembly having an inlet and an outlet, wherein the configuration of the outlet is adjustable, said apparatus comprising:

an upstream seat element positioned in the recess of the die body, said upstream seat element constructed with a first surface having at least a partially spherical shape, said spherical shape having a radius of curvature with a center;

a downstream seat element constructed for assembly with said upstream seat element, said downstream seat element constructed with a second surface having at least a partially spherical shape, said spherical shape having a radius of curvature with a center, wherein, when assembled said second surface forms at least a partial continuation of said first surface to form a seat surface;

a third surface constructed on said die, said third surface having at least a partially spherical shape, said spherical shape having a radius of curvature with a center;

said seat surface and said third surface being concentrically engaged at a mutual spherical-interface positioned upstream and downstream of said center, said surfaces operatively cooperating to allow the die to pivot relative to the die body about said center of said radius of curvature;

an adjustment mechanism constructed in the extrusion die assembly to exert a force on the die at a position downstream from the center of said radius of curvature of said first and second surfaces to cause movement between said surfaces and pivot the die to adjust the relative position of the die within the outlet.

5. Apparatus for adjusting the relative position of a die in an extrusion die assembly according to claim 4, further comprising:

an attachment mechanism constructed to secure said first and second seat elements in the assembled position surrounding said third surface, said mechanism further constructed to limit the movement of said first and second seat elements towards said third surface in order to prevent binding of said seat surface and said third surface in the assembled position.

6. Apparatus for adjusting the relative position of a die in an extrusion die assembly having an inlet and an outlet, wherein the configuration of the outlet is adjustable, as described in claim 5, wherein said attachment mechanism comprises at least one screw in threaded engagement between said first and second seat elements, said threaded engagement being restricted to limit movement of said seat elements into engagement.

7. Apparatus for adjusting the relative position of a die in an extrusion die assembly having an inlet and an outlet, wherein the configuration of the outlet is adjustable, as described in claim 5, wherein said attachment mechanism provides a predetermined clearance between said seat elements.

* * * * *